US010043066B2

(12) United States Patent
Lawrence (10) Patent No.: US 10,043,066 B2
(45) Date of Patent: Aug. 7, 2018

(54) GESTURE MASKING IN A VIDEO FEED (71) Applicant: Intel Corporation, Santa Clara, CA (US)

(72) Inventor: Sean J. W. Lawrence, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/239,033

(22) Filed: Aug. 17, 2016

(65) Prior Publication Data

US 2018/0053043 A1 Feb. 22, 2018

(51) Int. Cl.
G06K 9/00 (2006.01)
H04N 7/15 (2006.01)
H04L 29/06 (2006.01)

(52) U.S. Cl.
CPC ..... G06K 9/00355 (2013.01); G06K 9/00335 (2013.01); H04L 65/602 (2013.01); H04N 7/15 (2013.01)

(58) Field of Classification Search
CPC combination set(s) only.
See application file for complete search history.

(56) References Cited

U.S. PATENT DOCUMENTS

| 8,495,514 | B1* | 7/2013 | Ludolph | G06F 3/0481 715/768 |
| 2003/0095705 | A1* | 5/2003 | Weast | G06T 11/001 382/167 |
| 2003/0198384 | A1* | 10/2003 | Vrhel | A61B 5/0077 382/190 |
| 2008/0136895 | A1* | 6/2008 | Mareachen | H04N 7/147 348/14.03 |
| 2008/0141181 | A1* | 6/2008 | Ishigaki | G06F 3/011 715/863 |
| 2009/0262187 | A1* | 10/2009 | Asada | G06F 3/017 348/77 |
| 2011/0107216 | A1* | 5/2011 | Bi | G06F 3/011 715/716 |
| 2011/0243380 | A1* | 10/2011 | Forutanpour | G06F 3/017 382/103 |
| 2013/0342636 | A1* | 12/2013 | Tian | G06F 3/017 348/14.08 |
| 2015/0288883 | A1* | 10/2015 | Shigeta | G06F 3/011 345/642 |

* cited by examiner

Primary Examiner — Joseph J Nguyen
(74) Attorney, Agent, or Firm — Schwegman Lundberg & Woessner, P.A.

(57) ABSTRACT

Various systems and methods for processing video data, including gesture masking in a video feed, are provided herein. The system can include a camera system interface to receive video data from a camera system; a gesture detection unit to determine a gesture within the video data, the gesture being performed by a user; a permission module to determine a masking permission associated with the gesture; and a video processor. The video processor can modify a portion of the video data associated with the gesture in accordance with the masking permission, and cause the portion of the video data to be displayed. The camera system includes a depth camera or an infrared camera. The gesture detection unit determines the gesture based on machine learning.

22 Claims, 5 Drawing Sheets

GESTURE MASKING IN A VIDEO FEED

TECHNICAL FIELD

Embodiments described herein generally relate to processing of video data and in particular, to gesture masking in a video feed.

BACKGROUND

With advancements in gesture detection, usability of gestures in computing devices and applications will become ubiquitous. With some computing devices, gestures are meant as local input and not for remote consumption. In this regard, in instances of video conferencing or other remote communication scenarios, gestures that are meant as local input may be undesirable for participants in the video conference or the remote communication scenario.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide processing of video data and more specifically, gesture masking in a video feed. A device may be running a local application and monitoring a video feed for gestures, which may be used as input to the application (e.g., the gestures may be interpreted as commands or input and the application may act upon them). The device may also be running a video conference client using the video feed. To avoid confusing video conference participants, the gestures associated with the local application can be masked so that they are not visible to the conference participants. In instances when the gesture is not associated with the local application and it is associated with the video conference (e.g., the user is gesturing as part of the video conference), then the gestures may be left unmodified. In instances when the gestures are used as input to the local application as well as an input to the video conference client, then the gesture may also be left unmodified.

Figure 1:
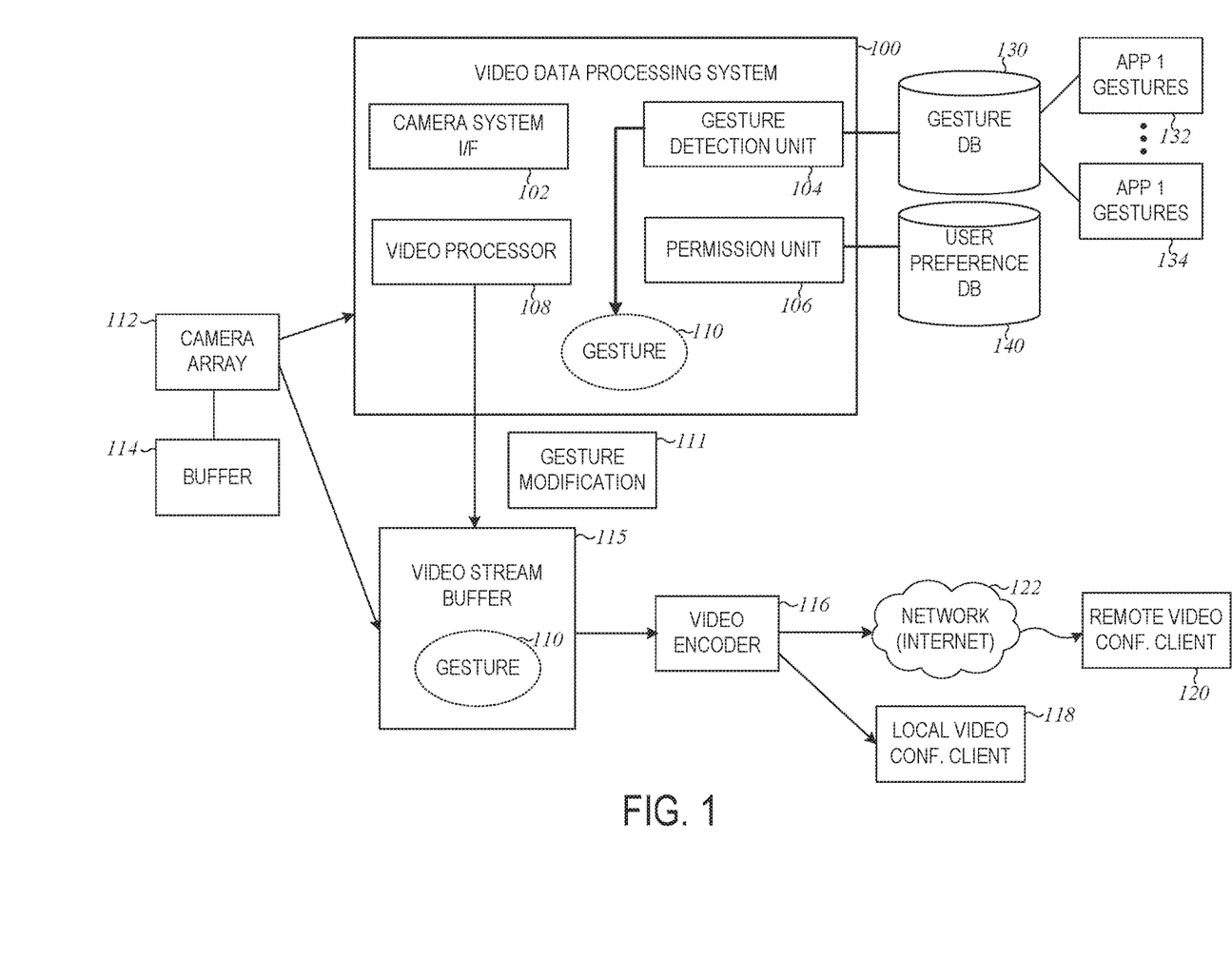
FIG. 1 is a diagram illustrating a video data processing system, according to an embodiment.

FIG. 1 is a diagram illustrating a video data processing system, according to an embodiment. Referring to FIG. 1, the video data processing system 100 may include a camera system interface 102, a gesture detection unit 104, a permission unit 106, and a video processor 108.

The camera system interface 102 may receive camera signal information from a camera array 112, which may be installed on the system 100 or be remote, but communicatively coupled to the system 100. For instance, the camera system interface 102 may receive raw video signal information or processed signal information (e.g., compressed video signals). In another aspect, the camera system interface 102 may be used to receive video data from a buffer 114, which may be remote from the system 100 or may be included as part of the system 100. The camera array 112 may be a depth camera, an infrared camera, visible light camera, or another type of camera. Further, the camera array 112 may include multiple types of cameras, which may work in concert with each other or may be bundled into the same optical capture system.

The gesture detection unit 104 may comprise suitable circuitry, logic and/or code and is capable of analyzing image or video data received by the camera system interface 102, and detect and identify a gesture exhibited by movements performed by a person in the image or video data (e.g., a user of a device incorporating the system 100). The gesture detection unit 104 determines whether the movements constitute a recognized gesture (e.g., by using machine learning). If the movements do constitute a recognized gesture, the gesture detection unit 104 may provide the recognized gesture to the permission unit 106 and the video processor 108 for further processing.

To detect the gesture, the gesture detection unit 104 may access a gesture database 130. The gesture detection unit 104 accesses image data of a movement (e.g., movement of an arm, finger, foot, or hand motion) of a user captured by the camera array 112 and received via the camera system interface 102. The gesture detection unit 104 then identifies the gesture (e.g., gesture 110) from the gesture database 130 based on the image data. The image data may be a number of successive images (e.g., video) over which the gesture 110 is performed.

In another aspect, the gesture detection unit 104 accesses depth image data of an arm, finger, foot, or hand motion of a user captured by the camera array 112, and identifies the gesture (e.g., gesture 110) from the gesture database 130 based on the depth image data. The depth image data may be a number of successive images (e.g., video) over which the gesture 110 is performed.

In an example, the gesture database 130 may be organized based on applications (or apps) that may use gestures (e.g., as inputs). More specifically, the available gestures in database 130 may be organized as gestures 132, . . . , 134 associated with apps 1, . . . , N, respectively. The apps 1, . . . , N may be applications running locally (e.g., on the device implementing the system 100) as well as remote applications (e.g., remote conference clients) running remotely from the device. The gesture database 130 may also include information indicating whether the apps 1, . . . , N allows a corresponding gesture to be displayed (e.g., if a gesture is used as an input to an application, then the application may not allow that gesture to be displayed within a video feed).

In another aspect, the gesture detection unit 104 operates independent from the camera system interface 102, and receives information or data that indicates a gesture via a different pathway. For example, in an aspect, to detect the selection gesture, the gesture detection unit 104 is to access motion data from an auxiliary device, the motion data describing an arm, finger, foot, or hand motion of the user and identify the gesture based on the motion data. The auxiliary device may be a mobile device, such as a smartphone, a wearable device, such as a smartwatch or a glove, or other type of device moveable by the user in free space. Examples include, but are not limited to, smartphones, smartwatches, e-textiles (e.g., shirts, gloves, pants, shoes, etc.), smart bracelets, smart rings, or the like.

The permission unit 106 may comprise suitable circuitry, logic, and/or code and is capable of determining a masking permission associated with the detected gesture. The masking permission may indicate (e.g., to the video processor 108) whether the detected gesture is to be modified or left unmodified. In an example, the permission unit 106 may access the gesture database 130 and identify whether the gesture is associated with an application that allows gestures to be displayed. Optionally, the gesture detection unit 104 may provide information identifying the gesture (e.g., 110) as well as an application (or applications) associated with the gesture. The gesture detection unit 104 may also provide information indicating whether the application associated with the gesture allows the gesture to be displayed. The permission unit 106 may generate the masking permission based on whether the gesture may be displayed.

In another aspect, the permission unit 106 may access a user preference database 140 to determine a user preference associated with the detected gesture 110. The user preference database 140 may be a user-specific database associated with an account of a user of the system 100, where the user may set up specific masking permissions for certain gestures.

The user preference may indicate whether the gesture is to be modified when displayed, based on the application (or applications) it is associated with. For example, a paging gesture with one hand may be an input gesture for changing pages within a local word-processing app running on the device with system 100. The user preference for this gesture may indicate that the gesture is to be modified within a video feed with the gesture, since the gesture is associated with a local application running on the device.

In another example, the same paging gesture may be used locally by the word-processing app but may also be used by a remote app, such as a remote video conferencing client 120. The remote video conferencing client 120 may be used for video conferencing between a user of the device using the processing system 100 and another user. In this case, since the same gesture may be used locally as well as by the remote client, the user preference may indicate that the gesture is to be unmodified within the video feed.

In yet another example, the paging gesture may be associated only with the remote video conferencing client 120. In this case, the user preference may indicate that the gesture is to be unmodified since it is only being used by the video conferencing client 120. The user preference database 140 may also indicate a universal masking permission when a gesture is not found within the gesture database 130 (e.g., mask any gesture that is not within the database 130).

The video processor 108 may comprise suitable circuitry, logic, and/or code and is capable of performing gesture modification in connection with a detected gesture 110. Incoming video data from camera array 112 may be communicated to both the video data processing system 100 and the video stream buffer 115. After the gesture 110 is identified and the masking permission for the gesture is determined, the video processor 108 may perform gesture modification 111 in connection with the masking permission determined by the permission unit 106. More specifically, the video processor 108 may obtain pixel coordinates associated with the gesture 110 (e.g., from the gesture detection unit 104). The pixel coordinates of the gesture may be used by the video processor 108 to access the video data within the buffer 115 and modify one or more video frames that include the gesture.

The gesture modification may include masking (censoring) the pixel region of the gesture within one or more video frames (e.g., placing a black box mask or another type of mask or blur within the pixel region of the gesture). Alternative gesture modifications may include removing the frames containing the gesture from the video feed, or replacing the frames containing the gesture with frames (e.g., previous frames) that do not contain the gesture. The modified video data from the video stream buffer may be encoded by video encoder 116, and may be communicated to a local video conference client 118 or to a remote video conference client 120 (via the network 122).

The camera system interface 102, gesture detection unit 104, permission unit 106, and video processor 108 are understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entities may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

Even though the databases 13 and 140, as well as the video encoder 116, are illustrated separately from the video data processing system 100, the present disclosure may not be limited in this regard. The database 130, database 140, the video encoder 116 and/or the buffer 115 may be included as part of the system 100.

Figure 2A:
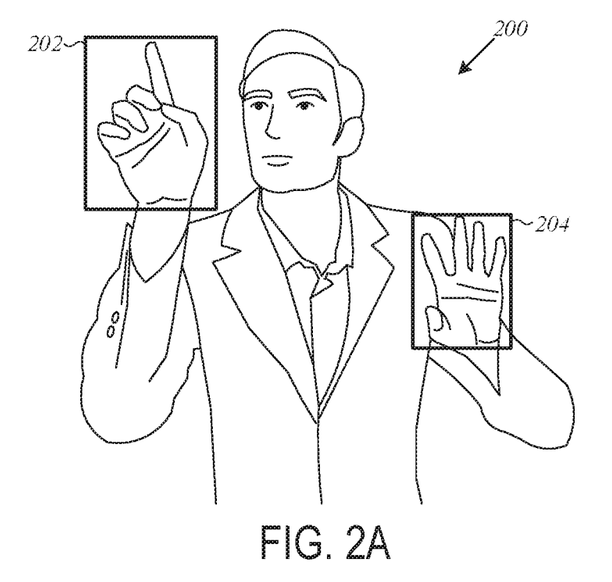
FIG. 2A illustrates an example gesture that has been detected by the video data processing system, according to an embodiment.

FIG. 2A illustrates an example gesture that has been detected by the video data processing system, according to an embodiment. Referring to FIG. 2A, the user 200 may be performing gestures during a video conference. The gesture detection unit 104 may detect hand gestures 202 and 204, and may determine that the gestures 202 and 204 are used as inputs for a word-processing application running on a device used by the user 200. The permission unit 106 may determine the masking permission for the gestures 202 and 204, which may indicate that the word-processing application does not allow display of the gestures, and the gestures have to be masked.

Figure 2B:
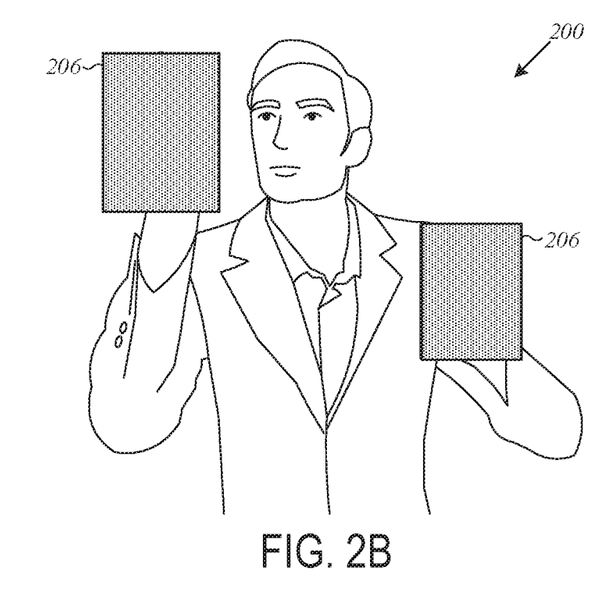
FIG. 2B illustrates masking of the gesture detected in FIG. 2A, according to an embodiment.

FIG. 2B illustrates masking of the gesture detected in FIG. 2A, according to an embodiment. Referring to FIG. 2B, the video processor 108 may perform gesture modification based on the masking permission determined by the permission unit 106. Since gestures 202 and 204 are associated with an application that does not allow display of gestures, the video processor performs gesture modification by placing a mask 206 over gestures 202 and 204.

Figure 3:
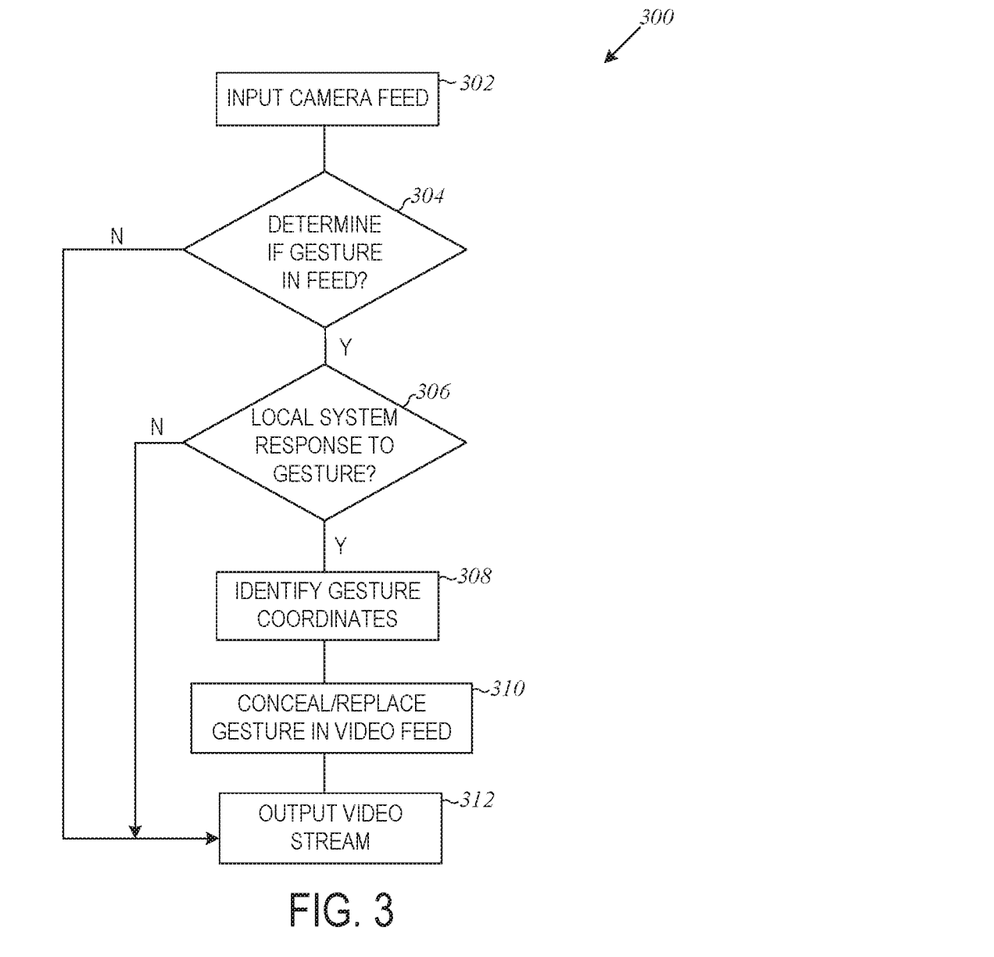
FIG. 3 and FIG. 4 are flowcharts illustrating example methods for processing of video data, according to an embodiment.
Figure 4:
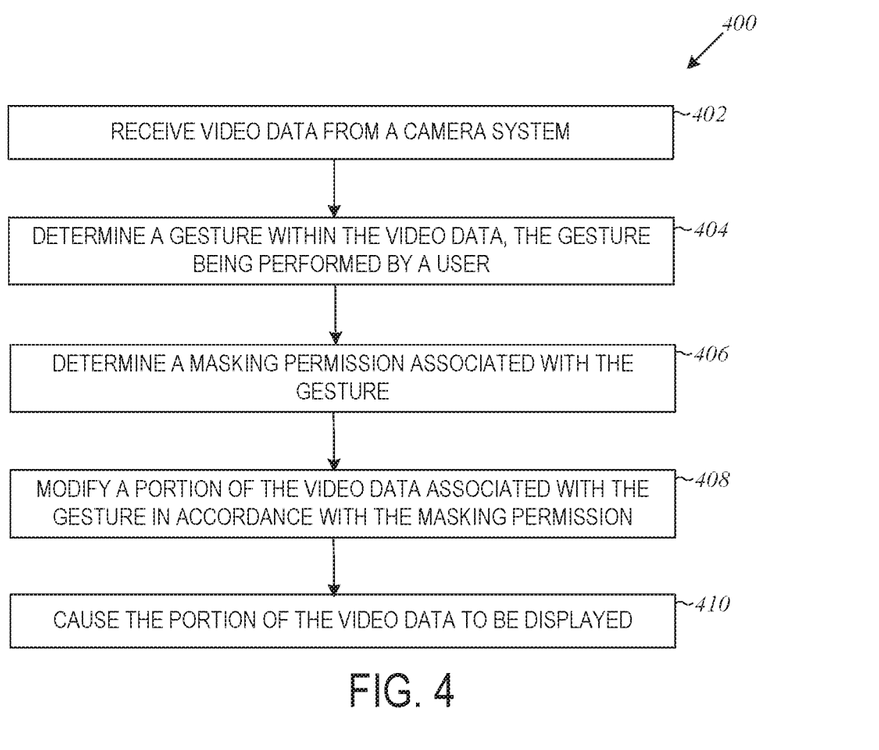

FIG. 3 and FIG. 4 are flowcharts illustrating example methods for processing of video data, according to an embodiment. Referring to FIG. 1 and FIG. 3, the example method 300 may start at 302, when an input video feed is received (e.g., via the camera array 112 and the camera system interface 102). At 304, the gesture detection unit 104 may determine whether a gesture is present within the video feed. If a gesture is not present, then the video encoder 116 encodes the video stream, and the encoded stream may be output at 312 (e.g., to a remote video conference client 120).

If a gesture is present, then at 308, it may be determined whether there is a local system response to the gesture. More specifically, it may be determined whether the detected gesture is an input to a local application (or is otherwise used by a local application). If there is no local system response to the gesture (e.g., the gesture is not used by the local application), then the video stream is output at 312. If there is a local system response to the gesture (i.e., the gesture is used by the local application), then at 308, the gesture detection unit 104 may identify the gesture coordinates (e.g., pixel coordinates in one or more frames containing the gesture) At 310, the video processor modifies the gesture (e.g., conceal or replace the gesture in the video feed stored in buffer 115) using the pixel coordinates of the gesture. After gesture modification, the video encoder 116 may encode the stream for output to the conference client 118 and/or 120.

Referring to FIG. 1 and FIG. 4, the example method 400 may start at block 402, when video data is received from a camera system. At block 404, a gesture is determined within the video data, where the gesture may be performed by a user. At block 406, a masking permission may be determined where the masking permission may be associated with the detected gesture. At block 408, a portion of the video data associated with the gesture may be modified in accordance with the masking permission. At block 410, the portion of the video data may be displayed.

In an embodiment, determining of the gesture includes accessing a gesture database with available gestures to determine a match. The gesture may be any type of gesture, as discussed above, and may include actions such as pointing, waving hands, or other similar gestures. Additionally, determining of the gesture may include determining an application that is associated with the gesture (e.g., the application uses the gesture as a command or input).

In an embodiment, determining the masking permission may include accessing a user preferences database to determine a user preference associated with the gesture. The user preference can indicate whether the gesture is to be modified when displayed. For example, the user preference can indicate that the gesture is to be modified when the gesture is associated with a local application running on the video processing system (e.g., the gesture is used by the local application but it is not needed for a video conference client using the video feed).

In an embodiment, modifying the portion of the video data associated with the gesture includes replacing or obscuring the gesture based on the masking permission. Replacing the gesture may include accessing a buffer to obtain a previously displayed frame from the video data, and displaying the previously displayed frame as a replacement to a video frame with the gesture.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 5:
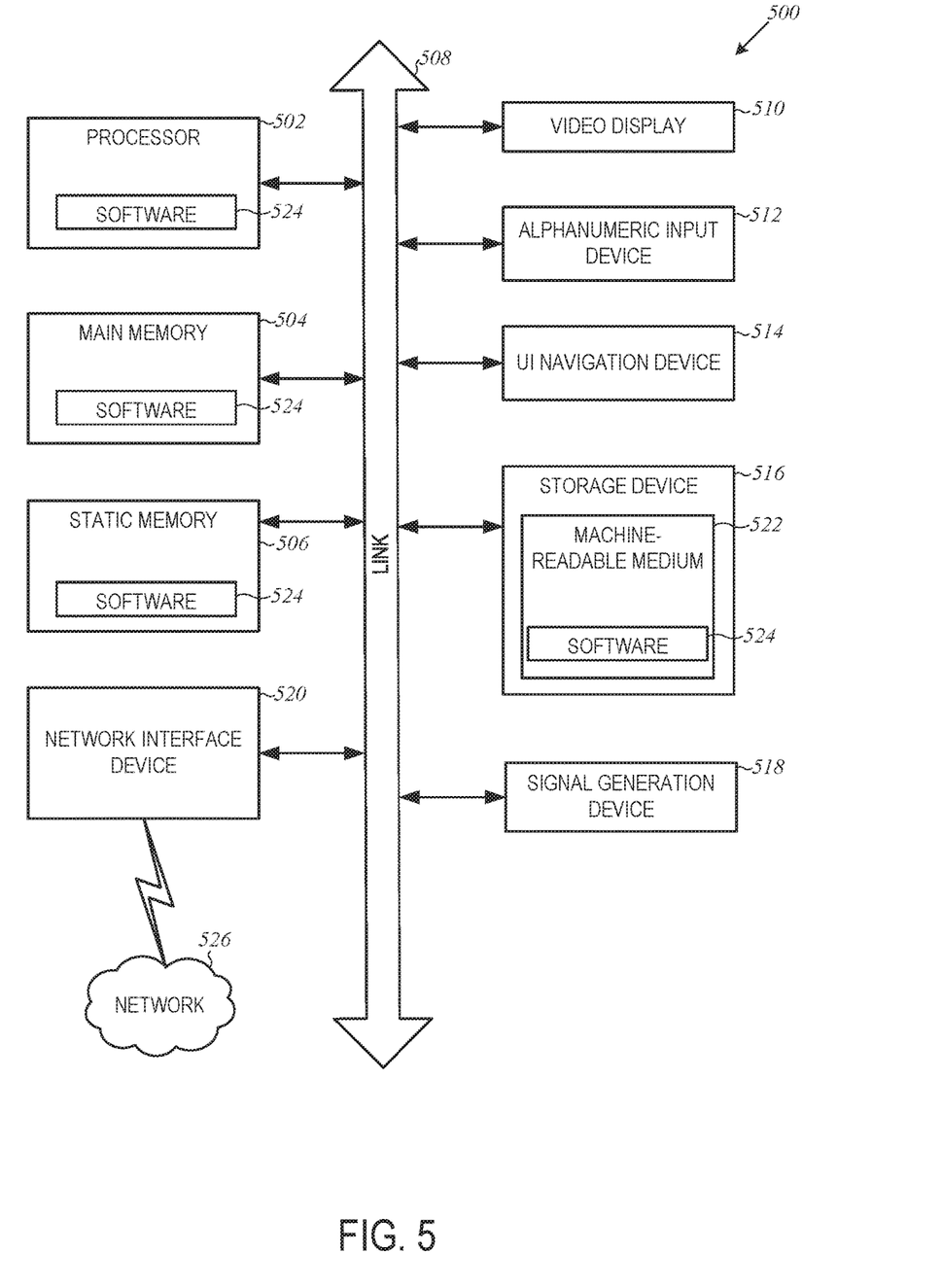
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, pyrometer, magnetometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for processing video data, the system comprising: a camera system interface to receive video data from a camera system; a gesture detection unit to determine a gesture within the video data, the gesture being performed by a user; a permission module to determine a masking permission associated with the gesture; and a video processor to: modify a portion of the video data associated with the gesture in accordance with the masking permission; and cause the portion of the video data to be displayed.

In Example 2, the subject matter of Example 1 optionally includes wherein the camera system includes a depth camera.

In Example 3, the subject matter of any one or more of Examples 1-2 optionally include wherein the camera system includes an infrared camera.

In Example 4, the subject matter of any one or more of Examples 1-3 optionally include wherein the camera system interface receives the video data from a buffer, wherein the buffer is remote from the system.

In Example 5, the subject matter of any one or more of Examples 1-4 optionally include wherein the gesture detection unit determines the gesture based on machine learning.

In Example 6, the subject matter of any one or more of Examples 1-5 optionally include wherein the gesture is waving hands.

In Example 7, the subject matter of any one or more of Examples 1-6 optionally include wherein to determine the masking permission, the permission module is to: access a database of gestures; and identify whether the gesture is associated with an application that allows gestures to be displayed.

In Example 8, the subject matter of any one or more of Examples 1-7 optionally include wherein to determine the masking permission, the permission module is to access a user preferences database to determine a user preference associated with the gesture.

In Example 9, the subject matter of Example 8 optionally includes wherein the user preference indicates whether the gesture is to be modified when displayed.

In Example 10, the subject matter of any one or more of Examples 8-9 optionally include wherein the user preference indicates that the gesture is to be modified when the gesture is associated with a local application running on the system.

In Example 11, the subject matter of Example 10 optionally includes wherein the user preference indicates that the gesture is to be unmodified when the gesture is associated with the local application running on the system and with a video conferencing client.

In Example 12, the subject matter of any one or more of Examples 8-11 optionally include wherein the user preference indicates that the gesture is to be unmodified when the gesture is associated with a video conferencing client.

In Example 13, the subject matter of any one or more of Examples 1-12 optionally include wherein to modify the video data, the video processor replaces or obscures the gesture based on the masking permission.

In Example 14, the subject matter of Example 13 optionally includes wherein to replace the gesture, the video processor: accesses a buffer to obtain a previously displayed frame from the video data; and displays the previously displayed frame as a replacement to a video frame with the gesture.

In Example 15, the subject matter of Example 14 optionally includes wherein the buffer is incorporated into the system, In Example 16, the subject matter of any one or more of Examples 13-15 optionally include wherein the processor comprises an encoder to encode the modified video data.

In Example 17, the subject matter of any one or more of Examples 1-16 optionally include a video conferencing client to present the video data in a video conference feed.

In Example 18, the subject matter of any one or more of Examples 1-17 optionally include wherein the video processor is further to: freeze display of the video data at a first video frame that does not contain the gesture; and resume display of the video data at a second video frame without the gesture, the second video frame located after the portion of the video data associated with the gesture, Example 19 is a method for processing video data, the method comprising: receiving, at a processor-based video processing system, video data from a camera system; determining a gesture within the video data, the gesture being performed by a user; determining a masking permission associated with the gesture; modifying a portion of the video data associated with the gesture in accordance with the masking permission; and cause the portion of the video data to be displayed.

In Example 20, the subject matter of Example 19 optionally includes wherein the camera system includes a depth camera.

In Example 21, the subject matter of any one or more of Examples 19-20 ) optionally include wherein the camera system includes an infrared camera.

In Example 22, the subject matter of any one or more of Examples 19-21 optionally include wherein receiving the video data comprises receiving the video data from a buffer, wherein the buffer is remote from the system.

In Example 23, the subject matter of any one or more of Examples 19-22 optionally include determining the gesture based on machine learning.

In Example 24, the subject matter of any one or more of Examples 19-23 optionally include wherein the gesture is waving hands, In Example 25, the subject matter of any one or more of Examples 19-24 optionally include wherein determining the masking permission comprises: accessing a database of gestures; and identifying whether the gesture is associated with an application that allows gestures to be displayed.

In Example 26, the subject matter of any one or more of Examples 19-25 optionally include wherein determining the masking permission comprises: accessing a user preferences database to determine a user preference associated with the gesture.

In Example 27, the subject matter of Example 26 optionally includes wherein the user preference indicates whether the gesture is to be modified when displayed.

In Example 28, the subject matter of any one or more of Examples 26-27 optionally include wherein the user preference indicates that the gesture is to be modified when the gesture is associated with a local application running on the video processing system.

In Example 29, the subject matter of Example 28 optionally includes wherein the user preference indicates that the gesture is to be unmodified when the gesture is associated with the local application running on the system and with a video conferencing client.

In Example 30, the subject matter of any one or more of Examples 26-29 optionally include wherein the user preference indicates that the gesture is to be unmodified when the gesture is associated with a video conferencing client.

In Example 31, the subject matter of any one or more of Examples 19-30 optionally include wherein modifying the video data comprises: replacing or obscuring the gesture based on the masking permission.

In Example 32, the subject matter of Example 31 optionally includes wherein replacing the gesture comprises: accessing a buffer to obtain a previously displayed frame from the video data; and displaying the previously displayed frame as a replacement to a video frame with the gesture.

In Example 33, the subject matter of Example 32 optionally includes wherein the buffer is incorporated into the system.

In Example 34, the subject matter of any one or more of Examples 31-33 optionally include encoding the modified video data.

In Example 35, the subject matter of any one or more of Examples 19-34 optionally include presenting the video data in a video conference feed.

Example 36 is at least one machine readable medium that, when executed by a machine, causes the machine to perform any of the methods of Examples 19-35.

Example 37 is a device comprising means to perform any of the methods of Examples 19-35.

Example 38 is a device for processing video data, the device comprising: means for receiving, at a processor-based video processing system, video data from a camera system; means for determining a gesture within the video data, the gesture being performed by a user; means for determining a masking permission associated with the gesture; means for modifying a portion of the video data associated with the gesture in accordance with the masking permission; and means for cause the portion of the video data to be displayed.

In Example 39, the subject matter of Example 38 optionally includes wherein the camera system includes a depth camera.

In Example 40, the subject matter of any one or more of Examples 38-39 optionally include wherein the camera system includes an infrared camera.

In Example 41, the subject matter of any one or more of Examples 38-40 optionally include wherein receiving the video data comprises receiving the video data from a buffer, wherein the buffer is remote from the system.

In Example 42, the subject matter of any one or more of Examples 38-41 optionally include means for determining the gesture based on machine learning.

In Example 43, the subject matter of any one or more of Examples 38-42 optionally include wherein the gesture is waving hands, in Example 44, the subject matter of any one or more of Examples 38-43 optionally include wherein the means for determining the masking permission comprises: means for accessing a database of gestures; and means for identifying whether the gesture is associated with an application that allows gestures to be displayed.

in Example 45, the subject matter of any one or more of Examples 38-44 optionally include wherein the means for determining the masking permission comprises: means for accessing a user preferences database to determine a user preference associated with the gesture.

In Example 46, the subject matter of Example 45 optionally includes wherein the user preference indicates whether the gesture is to be modified when displayed.

In Example 47, the subject matter of any one or more of Examples 45-46 optionally include wherein the user preference indicates that the gesture is to be modified when the gesture is associated with a local application running on the video processing system.

in Example 48, the subject matter of Example 47 optionally includes wherein the user preference indicates that the gesture is to be unmodified when the gesture is associated with the local application running on the system and with a video conferencing client.

In Example 49, the subject matter of any one or more of Examples 45-48 optionally include wherein the user preference indicates that the gesture is to be unmodified when the gesture is associated with a video conferencing client.

In Example 50, the subject matter of any one or more of Examples 38-49 optionally include wherein the means for modifying the video data comprises: means for replacing or obscuring the gesture based on the masking permission.

In Example 51, the subject matter of Example 50 optionally includes wherein the means for replacing the gesture comprises: means for accessing a buffer to obtain a previously displayed frame from the video data; and means for displaying the previously displayed frame as a replacement to a video frame with the gesture.

In Example 52, the subject matter of Example 51 optionally includes wherein the buffer is incorporated into the system.

In Example 53, the subject matter of any one or more of Examples 50-52 optionally include means for encoding the modified video data.

In Example 54, the subject matter of any one or more of Examples 38-53 optionally include means for presenting the video data in a video conference feed.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for processing video data, the system comprising:
    a camera system interface to receive the video data;
    a gesture detection unit to detect a human gesture within the video data;
    a permission unit to determine a masking permission based on an association of the human gesture with an application allowing display of gestures, the masking permission for replacing or obscuring the human gesture in the video data; and
    a video processor to:
        modify a first portion within a segment of the received video data associated with the detected human gesture based on the masking permission, wherein to modify the first portion, the video processor replaces or obscures the human gesture within the first portion of the received video data based on the masking permission, while continuing to display at least a second portion of the received video data; and
        communicate the video data to a remote video processing system for display.

2. The system according to claim 1, wherein the camera system includes a depth camera.

3. The system according to claim 1, wherein the gesture detection unit detects the human gesture based on machine learning.

4. The system according to claim 1, wherein the human gesture is waving hands.

5. The system according to claim 1, wherein to determine the masking permission, the permission unit is to access a user preferences database to determine a user preference associated with the human gesture.

6. The system according to claim 5, wherein the user preference indicates whether the human gesture is to be modified when displayed.

7. The system according to claim 5, wherein the user preference indicates that the human gesture is to be modified when the human gesture is associated with a local application running on the system.

8. The system according to claim 7, wherein the user preference indicates that the human gesture is to be unmodified when the human gesture is associated with the local application running on the system and with a video conferencing client.

9. The system according to claim 5, wherein the user preference indicates that the human gesture is to be unmodified when the human gesture is associated with a video conferencing client.

10. The system according to claim 1, wherein to modify the first portion, the video processor replaces or obscures the gesture based on the masking permission.

11. The system according to claim 10, wherein to replace or obscure the human gesture, the video processor is to:
    access a buffer to obtain a previously displayed frame from the video data; and
    display the previously displayed frame as a replacement to a video frame with the human gesture.

12. A method for processing video data, the method comprising:
    receiving video data at a processor-based video processing system;
    detecting a human gesture within the video data;
    determining a masking permission based on an association of the gesture with an application allowing display of gestures, the masking permission for replacing or obscuring the gesture in the video data;
    replacing or obscuring the human gesture within a first portion of a segment of the video data based on the masking permission; and
    communicating the video data with the replaced or obscured human gesture to a remote video processing system for display, the video data including the first portion modified in accordance with the masking permission and at least a second portion of the video data that is unmodified based on the masking permission.

13. The method according to claim 12, wherein the camera system includes an infrared camera.

14. The method according to claim 12, wherein receiving the video data comprises receiving the video data from a buffer, wherein the buffer is remote from the system.

15. The method according to claim 12, further comprising:
    determining the human gesture based on machine learning.

16. The method according to claim 12, wherein the human gesture is waving hands.

17. The method according to claim 12, wherein determining the masking permission comprises:
    accessing a user preferences database to determine a user preference associated with the human vesture.

18. The method according to claim 17, wherein the user preference indicates whether the human gesture is to be modified when displayed.

19. The method according to claim 17, wherein the user preference indicates that the gesture is to be modified when the human gesture is associated with a local application running on the video processing system.

20. At least one non-transitory machine-readable medium including instructions, which when executed by a machine, cause the machine to:
    receive video data;
    detect a human gesture within the video data;
    determine a masking permission based on an association of the gesture with an application allowing display of gestures, the masking permission for replacing or obscuring the gesture in the video data;
    replace or obscure the human gesture within a first portion of a segment of the video data based on the masking permission; and
    communicate the video data with the replaced or obscured human gesture to a remote video processing system for display, the video data including the first portion modified in accordance with the masking permission and at least a second portion of the video data that is unmodified based on the masking permission.

21. The machine-readable medium according to claim 20, wherein the camera system includes a depth camera or an infrared camera.

22. The machine-readable medium according to claim 20, wherein when executed by the machine, the instructions further cause the machine to:
    determine the human gesture based on machine learning.

* * * * *

UNITED STATES PATENT AND TRADEMARK OFFICE
CERTIFICATE OF CORRECTION

PATENT NO. : 10,043,066 B2
APPLICATION NO. : 15/239033
DATED : August 7, 2018
INVENTOR(S) : Sean J. W. Lawrence Page 1 of 1

It is certified that error appears in the above-identified patent and that said Letters Patent is hereby corrected as shown below:

In the Claims

In Column 14, Line 17, in Claim 17, delete "vesture." and insert --gesture.-- therefor Signed and Sealed this
Twenty-eighth Day of May, 2019

Andrei Iancu
*Director of the United States Patent and Trademark Office*